United States Patent [19]
Lakin et al.

[11] Patent Number: 5,287,048
[45] Date of Patent: Feb. 15, 1994

[54] ELECTRONIC GAS VALVE POWER INTERRUPTION SWITCH

[75] Inventors: Bryan L. Lakin, Nixa; David B. Hyppio, Springfield, both of Mo.

[73] Assignee: Fasco Industries, Inc., Cassville, Mo.

[21] Appl. No.: 888,058

[22] Filed: May 22, 1992

[51] Int. Cl.⁵ .............................. F24H 3/02; H02H 5/00
[52] U.S. Cl. ...................................... 318/459; 361/33; 361/170; 110/193; 236/DIG. 3
[58] Field of Search ............ 126/99 R, 110 R, 110 A, 126/110 B, 116 R, 116 A, 117; 236/10, 15 R, 67, 74 R, 78 R, 78 A, DIG. 3, DIG. 9; 237/2 R, 2 A; 110/185, 193, 162; 318/459; 361/160, 170, 187, 33

[56] References Cited

U.S. PATENT DOCUMENTS

| | | | |
|---|---|---|---|
| 4,090,664 | 5/1978 | Elderkin | 236/11 |
| 4,978,292 | 12/1990 | Donnelly et al. | 431/75 |
| 4,981,262 | 1/1991 | Jackson | 237/19 |
| 5,052,367 | 10/1991 | Beavers et al. | 126/110 B |

*Primary Examiner*—Bentsu Ro
*Attorney, Agent, or Firm*—Lorusso & Loud

[57] ABSTRACT

An electronic safety circuit for a portable gas heater includes a transformer and half wave rectifier connected in parallel with a fan motor for charging a capacitor, and a solid state switching circuit, which may be either a pair of cascaded transistors, an SCR, or a Darlington switch, for applying a reverse polarity voltage across the solenoid of a solenoid operated gas valve to immediately turn off the gas valve in the event of loss of power to the combustion fan motor. The electronic safety circuit may be conveniently mounted on a PC board and enclosed in the combustion fan motor.

26 Claims, 2 Drawing Sheets

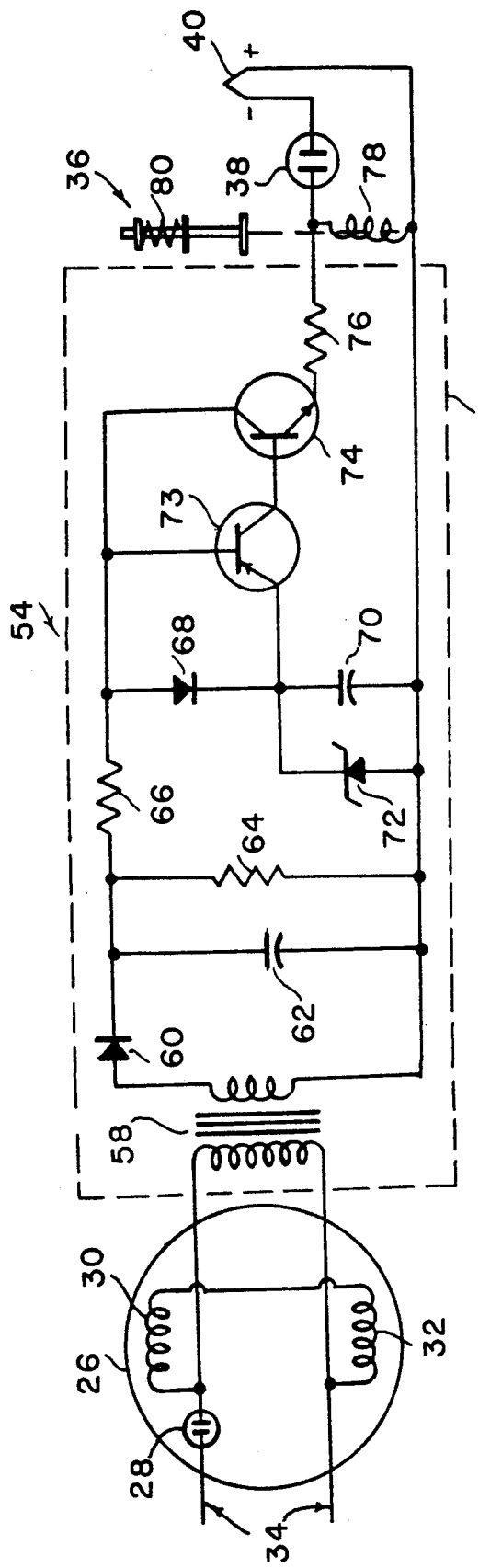
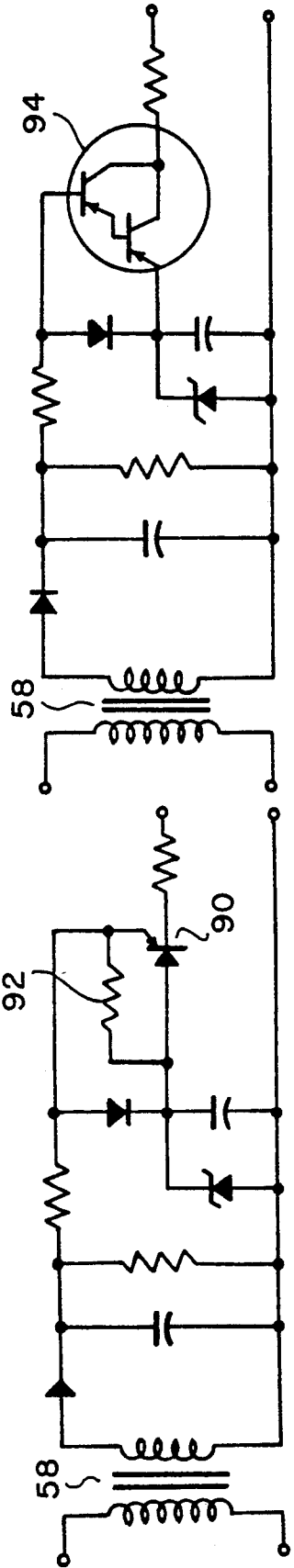
FIG. 4
FIG. 5
FIG. 6

ELECTRONIC GAS VALVE POWER INTERRUPTION SWITCH

BACKGROUND AND SUMMARY OF THE INVENTION

There are many different kinds of gas heaters and other gas appliances which utilize an electric fan motor for providing air to a combustion chamber in an appropriate amount such that the fuel/air mixture is at the desired ratio to produce a clean-burning efficient blue flame. Secondarily, the fan may also provide air flow around and over the combustion chamber which is heated thereby, as desired These appliances, including especially space heaters, typically include a gas valve which has a manually operated opening plunger which is mechanically biased by a return spring into the closed position, and an electromagnetic solenoid coil which, when energized, overcomes the force of the spring to hold open the gas valve to permit gas flow therethrough. To turn on the gas appliance, or heater, the gas valve plunger must be manually pushed and held open to permit gas flow therethrough as an operator manually ignites the flame with a piezoelectric igniter, for example. After ignition, the plunger must be held down for some time period, typically 30 seconds, until a thermocouple located in the combustion chamber is heated to a sufficient temperature in order to generate a sufficient current to hold the solenoid coil energized or latched in and thereby hold the gas valve open. As the thermocouple achieves this minimum temperature, the operator may release the plunger on the gas valve which will then remain in the open position permitting continued automatic operation of the heater. In order to turn the heater off, the proper sequence of operation requires that a main valve in the gas line be turned off which permits the residual gas in the line to flow through the solenoid operated gas valve and continue to burn until the gas is exhausted therefrom. As the flame self-extinguishes, the thermocouple temperature drops thereby reducing the amount of current produced thereby until the manual return spring on the gas valve overcomes the holding power of the solenoid coil and thereby manually closes.

Presuming the correct sequence of operation is followed, the gas line is self-exhausting and no unsafe or hazardous conditions are experienced. However, there are opportunities for improper operation, or for equipment difficulties to cause an unsafe condition. For example, if the operator disconnects the electrical power to the fan motor before shutting off the solenoid operated gas valve, or if the power to the fan motor is interrupted for any reason such as through an overload condition, accidentally turning the fan motor off by the operator, or inadvertently tripping over or otherwise pulling the power plug from its receptacle, the fan motor will cease to provide appropriate air for combustion to the combustion chamber but the gas will continue to flow through the solenoid operated gas valve. This fuel/air mixture typically will produce a significantly sized but weak, yellowish, inefficient flame to create a possible fire and fume hazard. This may typically continue for 30–40 seconds as the incomplete combustion and reduced temperature flame allows the cooling of the heat sensing thermocouple to a temperature where insufficient current and electrical power is generated to the solenoid holding coil to maintain the gas valve in an open position. After the thermocouple cools, as previously explained, the mechanical return spring finally overcomes the solenoid coil to close the gas valve and thereby extinguish the flame.

In the prior art, some gas appliances, including especially space heaters, are supplied with a normally open relay as an attempt at eliminating this unsafe condition. In this prior art solution, the relay coil winding is connected in parallel with the fan motor windings and its normally open switch contacts are connected in series with the thermocouple. Therefore, if power is interrupted to the fan motor, the relay coil de-energizes which opens its normally open contact to thereby electrically disconnect the thermocouple from the solenoid coil which will, ideally, permit the mechanical return spring to close the gas valve and thereby extinguish the flame. However, in application, these relays suffer several drawbacks. As the potential generated by the typical thermocouple utilized in these space heaters ranges between 7 and 20 millivolts, any appreciable increase in the contact resistance of the relay's normally open contact, as might be caused by contact oxidation or the contamination often experienced in these applications, prevents the flow of current to the gas valve even after the thermocouple reaches its appropriate temperature In this condition, the potential generated by the thermocouple will never be sufficient enough to hold the solenoid coil in an energized condition to overcome the mechanical return spring for the gas valve. Thus, an operator will remove his finger from the gas valve after the appropriate 30 second interval but the gas valve will turn off thereby preventing operation of the heater entirely In frustration, an operator may decide to short around the relay contacts in order to get the heater to work which will completely eliminate any protection provided by the relay.

In still another failure mode, the relay contact may become permanently closed in the event of a failure in the relay, such as through breakage of the armature return spring. The relay contacts may also become permanently bridged through the presence of metallic contamination. In either event, with the relay contacts remaining closed, the protection presumed to be afforded by the relay is not provided and an operator may be unaware of this unsafe condition. Additionally, an electromagnetic relay may be momentarily jarred open with any appropriate shock or impact which will result in a nuisance flame-out of the heater. Still another potential failure includes the chance for improper electrical connection to the fan motor which could result in connecting the relay directly to the fan motor coils and not in circuit with the thermo-protector. In this event, the thermoprotector could open to turn off the fan motor but yet the relay would remain energized to thereby create the conditions for a poorly burning flame as described above.

In order to solve these and other problems in the prior art, and to provide a safe and certain turnoff of a solenoid operated gas valve in a gas appliance, such as a space heater, the inventors herein have succeeded in designing and developing an electronic gas valve control circuit which may be conveniently mounted on a PC board and provided inside the fan motor itself such that a pair of leads may be conveniently connected in circuit with the solenoid coil for the gas valve. The electronic control circuit of the present invention includes a half wave rectifier circuit and capacitor for building up a DC potential, and a solid state switching circuit for sensing the loss of AC power to the fan motor and for applying the voltage from the charged capacitor to the solenoid coil in a reversed polarity which immediately turns off the solenoid coil to permit the immediate closing of the gas valve by the mechanical return spring. Several embodiments of this solid state circuit are disclosed, all of which are effective in applying an opposing flux to the solenoid coil instead of merely interrupting the current to the solenoid coil as in the prior art. In this manner, a safe and reliable safety circuit achieves immediate turn-off of the gas valve, eliminates the "hard starting", nuisance flame-out, and various other failures experienced by the safety relay of the prior art, and virtually eliminates any potential for misconnection by an operator or manufacturer which might otherwise defeat the safety feature expected by an operator. The present invention is relatively inexpensive, may be self-contained in the fan motor as mentioned above, and reliably eliminates the hazardous conditions experienced due to a gas valve which remains open while the thermocouple cools upon loss of an adequate air supply to support an adequate combustion in the combustion chamber While the principal advantages and features of the present invention have been described above, a more complete and thorough understanding of the invention may be attained by referring to the drawings and description of the preferred embodiment which follow

BRIEF DESCRIPTION OF THE DRAWINGS

FIG. 4 is an electrical schematic of a first embodiment of the safety control circuit of the present invention;

FIG. 5 is an electrical schematic of a second embodiment of the safety control circuit of the present FIG. 6 is an electrical schematic of a third embodiment of the safety control circuit of the present invention.

DETAILED DESCRIPTION OF THE PREFERRED EMBODIMENT

Figure 1:
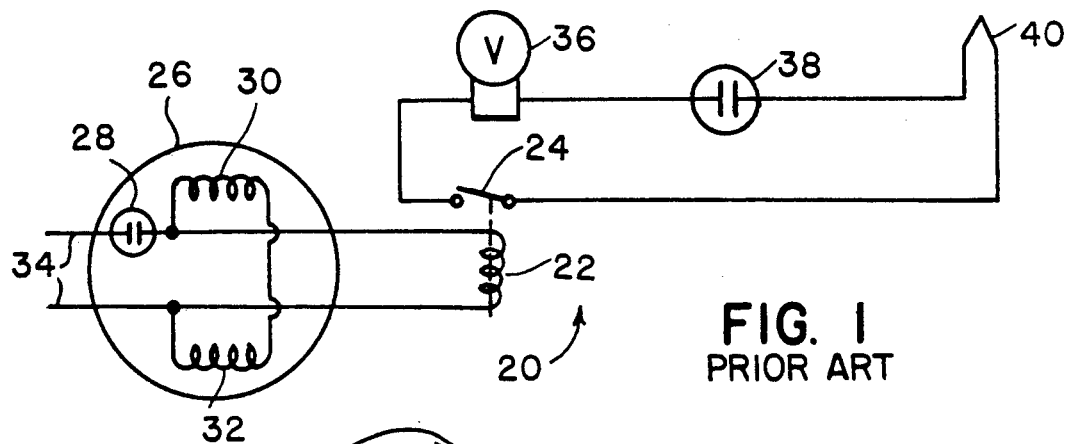
FIG. 1 is a schematic of the prior art arrangement with the normally opened safety relay.

In FIG. 1, an electrical schematic 20 of a prior art safety circuit using a safety relay 22 having a normally open contact 24 is shown. The fan motor 26 has an overload protector 28 in series with a pair of motor coils 30, 32 connected across 120 volt AC incoming lines 34. The relay contact 24 is in circuit with the solenoid operated gas valve 36, high heat protector switch 38, and thermocouple 40. As explained above, as long as there is 120 volts across the fan motor coils 30, 32, relay 22 is energized, contact 24 is closed, and when the thermocouple 40 is heated sufficiently, the current generated by thermocouple 40 will maintain the solenoid operated valve 36 in an open condition. Unfortunately, there are many drawbacks to this prior art arrangement, as explained above. These include failure of the contact 24, improper connection of the relay 22 with fan motor 26, and other conditions.

Figure 2:
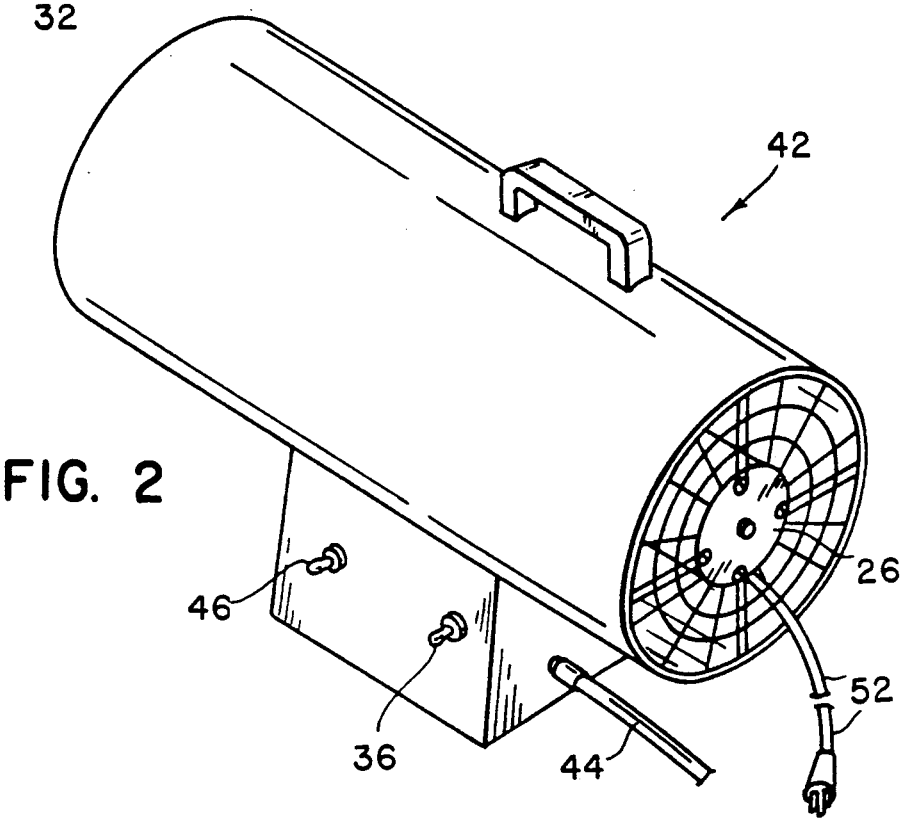
FIG. 2 is a perspective view of a space heater as m incorporate the gas valve safety circuit of the present invention.
Figure 3:
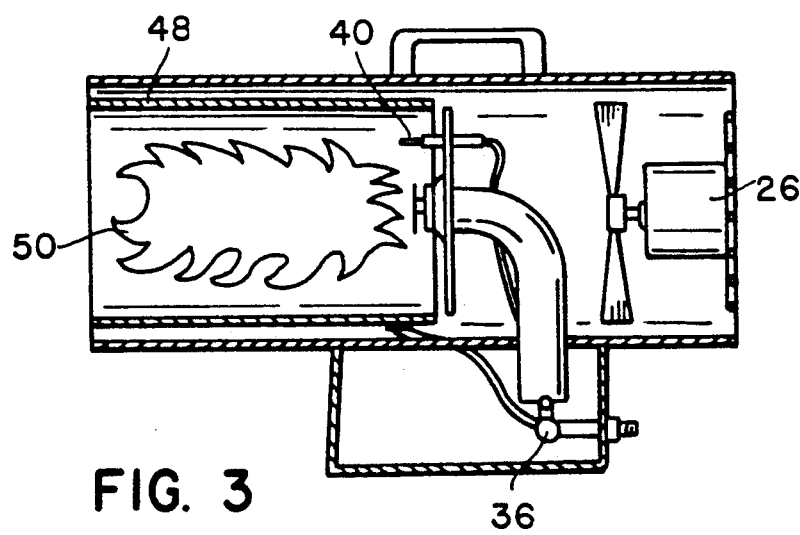
FIG. 3 is a cross-sectional view of the space heater of FIG. 2.

As shown in FIGS. 2 and 3, a space heater 42 with which the present invention may typically be used includes a gas line 44 through which LP or propane gas is supplied to the heater 42, a solenoid operated gas valve 36 which controls the flow of gas into the heater 42, a piezoelectric igniter 46, and the fan motor 26, as described above. The gas heater 42 includes a combustion chamber 48 within which a flame 50 is generated by the ignition of the fuel/air mixture. An electrical power cord 52 brings electrical power to the heater 42, as well known in the art.

A first embodiment of the electronic safety circuit 54 of the present invention is shown in FIG. 4 and includes a PC board 56 which may be conveniently used to mount the various electronic components comprising the electronic safety circuit 54. As shown therein, a transformer 58 may be used to reduce the line voltage to a low voltage level and isolate high voltage from the heater frame. A diode 60 along with capacitor 62 and resistor 64 provides a filtered half-wave rectified DC voltage which flows through a current limit resistor 66 and diode 68 to charge capacitor 70. A zener diode 72 maintains the voltage across capacitor 70. In this embodiment, a PNP transistor 73 is connected in cascade with a second NPN transistor 74 and is biased off by the voltage drop across diode 68. Transistor 74 remains off until pulsed on by transistor 73. A current limit resistor 76 is connected between the output of transistor 74 and the solenoid coil 78 of gas valve 36. Solenoid coil 78, when energized by thermocouple 40, overcomes the mechanical return force of the return spring 80 of gas valve 36, as previously explained.

In operation, when power is interrupted for any reason to the fan motor 26, the input AC voltage collapses and resistor 64 bleeds the charge off of capacitor 62 to thereby reduce its voltage. The voltage across capacitor 70 remains at the voltage imposed by zener diode 72 as it has no discharge path yet. This difference in voltages causes diode 68 to become reverse biased and current begins to flow from the positive plate of capacitor 70 to the emitter-base junction of transistor 73 and resistor 66, thereby turning on transistor 73 because of the positive emitter to base voltage. As current flows through transistor 73 into the base of transistor 74, it pulses on and the charge on capacitor 70 flows through resistor 76 into solenoid coil 78 in reverse polarity to that produced by the current generated by thermocouple 40 in coil 78, as shown. This immediately causes the deenergization of solenoid coil 78 which permits the mechanical return spring 80 of gas valve 36 to close it and cut off the supply of gas to the heater 42. Resistor 76 is connected in circuit with capacitor 70 to set up an RC circuit to provide a timed interval of the application of a reverse polarity voltage across solenoid coil 78 to ensure its immediate and continued de-energization.

Second and third embodiments of the present invention are shown in FIGS. 5 and 6. As shown in FIG. 5, an SCR 90 with biasing resistor 92 may be substituted for the cascaded transistor 73, 74 of the first embodiment as shown in FIG. 4. Similarly, as shown in FIG. 6, a Darlington switch 94 may be substituted. Operation of the second and third embodiments is essentially the same as that of the first embodiment except that a different solid state switching arrangement is utilized However, in all embodiments, an electronic switch impresses a current of reverse polarity across the solenoid coil in order to immediately reduce the existing flux, turn off the solenoid coil, and permit the mechanical return spring 80 to close the gas valve 36.

The invention is suitable for, and particularly adapted for, use with an AC fan motor. As would be apparent to one of ordinary skill in the art, a DC fan motor may be readily used with a circuit very similar to that shown in FIG. 4 except that transformer 58 would not be required Furthermore, although a separate transformer 58 is shown, an isolated transformer winding of the fan motor 26 may be readily substituted therefor. For operation on 240 volts AC, the same circuitry as shown in FIG. 4 may be conveniently used except that the transformer 58 is connected across only one of fan motor coils 30, 32.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a gas appliance having a fan motor for supplying a quantity of air, a gas supply valve having a mechanically biased and electrically held actuator, and a thermocouple in circuit with said gas supply valve, said thermocouple having means for sensing the heat of combustion of said appliance and generating sufficient electrical power in response thereto to hold said electrical actuator in a closed position, the improvement comprising a solid state circuit having means for sensing an interruption of electrical power to said fan motor and means for applying a turn off signal directly to said electrical actuator in response thereto to thereby affirmatively turn off said gas supply valve.

2. The gas appliance of claim 1 wherein said solid state circuit includes means for applying a flux of reverse polarity voltage to electrical actuator.

3. The gas appliance of claim 2 wherein said solid state circuit includes means for storing an electrical charge, and means for discharging said electrical charge through said electrical actuator.

4. The gas appliance of claim 3 wherein said storing means comprises a capacitor and said discharging means includes a solid state switching circuit.

5. The gas appliance of claim 4 further comprising a resistor connected in series between said solid state switching circuit, said capacitor, and said electrical actuator to thereby apply said reverse polarity voltage flux over a time interval sufficient to reliably achieve turn off of said gas supply valve.

6. The gas appliance of claim 5 wherein said solid state switching circuit includes at least two transistors connected in series so that as one transistor is turned on, it turns on the other of said transistors.

7. The gas appliance of claim 6 wherein said electrical actuator comprises a solenoid and said mechanical bias comprises a return spring.

8. The gas appliance of claim 4 wherein said solid state switching circuit includes an SCR.

9. The gas appliance of claim 8 further comprising a resistor connected in series between said SCR, said capacitor, and said electrical actuator to thereby apply said reverse polarity voltage flux over a time interval sufficient to reliably achieve turn off of said gas supply valve.

10. The gas appliance of claim 9 wherein said electrical actuator comprises a solenoid and said mechanical bias comprises a return spring.

11. The gas appliance of claim 4 wherein said solid state switching circuit includes a Darlington transistor switch.

12. A solid state safety circuit for applying a turn off signal to a solenoid operated gas supply valve upon interruption of electrical power to a fan motor, said circuit comprising means for sensing an interruption of electrical power to said fan motor, and means for applying a turn off signal to said gas supply valve in response thereto to thereby affirmatively turn off said gas supply valve.

13. The safety circuit of claim 12 further comprising means for storing an electrical charge, and wherein said signal applying means includes means in circuit with said storing means for discharging said stored electrical charge through said solenoid operated gas supply valve to thereby turn it off.

14. The safety circuit of claim 13 wherein said storing means comprises a capacitor, and wherein said signal applying means includes means for applying said stored electrical charge in a reverse polarity.

15. The safety circuit of claim 14 wherein said discharging means comprises a solid state switching circuit.

16. The safety circuit of claim 15 further comprising a resistor connected in series between said solid state switching circuit, said capacitor, and said solenoid operated gas supply valve to thereby apply said reverse polarity charge over a time interval sufficient to reliably achieve turn off of said solenoid operated gas supply valve.

17. The safety circuit of claim 16 wherein said solid state switching circuit includes at least two transistors connected in series so that as one transistor is turned on, it turns on the other of said transistors.

18. The safety circuit of claim 16 wherein said solid state switching circuit includes an SCR.

19. The safety circuit of claim 16 wherein said solid state switching circuit includes a Darlington transistor switch.

20. A fan motor for a gas appliance, said gas appliance having a solenoid operated gas supply valve, said fan motor including a safety circuit mounted on a PC board, said PC board being mounted inside said fan motor, said safety circuit including means for applying a reverse polarity voltage to said valve upon interruption of power to said fan motor to thereby immediately turn said valve off.

21. The fan motor of claim 20 wherein said safety circuit includes means for sensing an interruption of electrical power to said fan motor, means for storing an electrical charge, and means in circuit with said storing means for discharging said electrical charge through said valve.

22. The fan motor of claim 21 wherein said discharging means comprises a solid state switching circuit.

23. The fan motor of claim 22 wherein said storing means comprises a capacitor.

24. The fan motor of claim 23 wherein said solid state switching circuit includes at least two transistors connected in series so that as one transistor is turned on, it turns on the other of said transistors.

25. The fan motor of claim 23 wherein said solid state switching circuit includes an SCR.

26. The fan motor of claim 23 wherein said solid state switching circuit includes a Darlington transistor switch.

* * * * *